(12) United States Patent
Watariuchi

(10) Patent No.: US 11,102,359 B2
(45) Date of Patent: Aug. 24, 2021

(54) INFORMATION PROCESSING SYSTEM, CONTROL METHOD, AND STORAGE MEDIUM

(71) Applicant: CANON KABUSHIKI KAISHA, Tokyo (JP)

(72) Inventor: Satoki Watariuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/884,625

(22) Filed: May 27, 2020

(65) Prior Publication Data

US 2020/0382657 A1    Dec. 3, 2020

(30) Foreign Application Priority Data

May 31, 2019   (JP) .............................. JP2019-102883

(51) Int. Cl.
*H04N 1/00* (2006.01)
*H04W 4/80* (2018.01)

(52) U.S. Cl.
CPC ..... *H04N 1/00217* (2013.01); *H04N 1/00464* (2013.01); *H04N 1/00474* (2013.01); *H04W 4/80* (2018.02)

(58) Field of Classification Search
CPC .......... G06F 3/1292; H04N 2201/0094; H04N 2201/006; H04N 1/00408
See application file for complete search history.

(56) References Cited

U.S. PATENT DOCUMENTS

| | | | |
|---|---|---|---|
| 9,229,666 B2* | 1/2016 | Oguma | G06F 3/1286 |
| 9,961,226 B2* | 5/2018 | Tagaki | H04N 1/00307 |
| 2011/0157638 A1 | 6/2011 | Yamada | |
| 2012/0250059 A1* | 10/2012 | Itogawa | H04N 1/00307 358/1.13 |
| 2014/0285845 A1* | 9/2014 | Ishikawa | H04N 1/00482 358/1.15 |
| 2014/0355048 A1* | 12/2014 | Kang | G06F 3/1229 358/1.15 |
| 2014/0376037 A1* | 12/2014 | Onogi | H04N 1/32117 358/1.15 |
| 2014/0376051 A1* | 12/2014 | Oguma | G06F 3/1204 358/1.15 |
| 2015/0002872 A1* | 1/2015 | Naruse | H04N 21/43615 358/1.13 |
| 2015/0244654 A1* | 8/2015 | Tsubota | G06Q 50/01 709/206 |
| 2015/0293735 A1* | 10/2015 | Kawai | G06F 3/1292 358/1.15 |
| 2016/0188264 A1* | 6/2016 | Shintani | G06F 3/1263 358/1.15 |

(Continued)

FOREIGN PATENT DOCUMENTS

JP   2009-160936 A   7/2009
JP    2009160936 A  *  7/2009

(Continued)

*Primary Examiner* — Ted W Barnes
(74) *Attorney, Agent, or Firm* — Canon U.S.A., Inc., IP Division

(57) ABSTRACT

An information processing system allows an operation status of a web application cooperating with a multifunction peripheral (MFP) and being operated on a mobile terminal to be handed over to the MFP by simply causing the mobile terminal and the MFP to cooperate.

21 Claims, 18 Drawing Sheets

(56) References Cited

U.S. PATENT DOCUMENTS

| | | | |
|---|---|---|---|
| 2016/0274854 A1* | 9/2016 | Tokiwa | H04L 67/141 |
| 2017/0099400 A1* | 4/2017 | Onishi | H04N 1/00307 |
| 2017/0142268 A1* | 5/2017 | Ichiyama | H04N 1/00392 |
| 2017/0264758 A1* | 9/2017 | Naito | H04N 1/4426 |
| 2018/0027135 A1* | 1/2018 | Kurihara | H04W 36/0033 |
| | | | 358/1.15 |
| 2018/0131824 A1* | 5/2018 | Kamasuka | H04N 1/00037 |
| 2018/0335993 A1* | 11/2018 | Kanai | G06F 3/1204 |
| 2020/0341711 A1* | 10/2020 | Nakamura | G06F 3/1292 |

FOREIGN PATENT DOCUMENTS

| | | | | |
|---|---|---|---|---|
| JP | 2015-207247 A | | 11/2015 | |
| JP | 2015207247 A | * | 11/2015 | H04N 1/00307 |
| JP | 2017-108338 A | | 6/2017 | |

* cited by examiner

APPLICATION SERVER 104

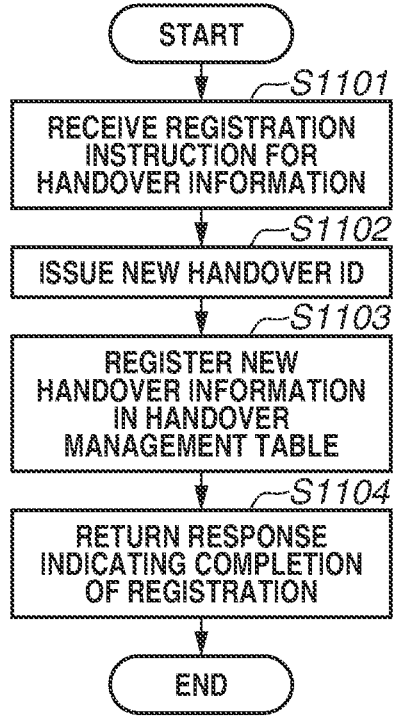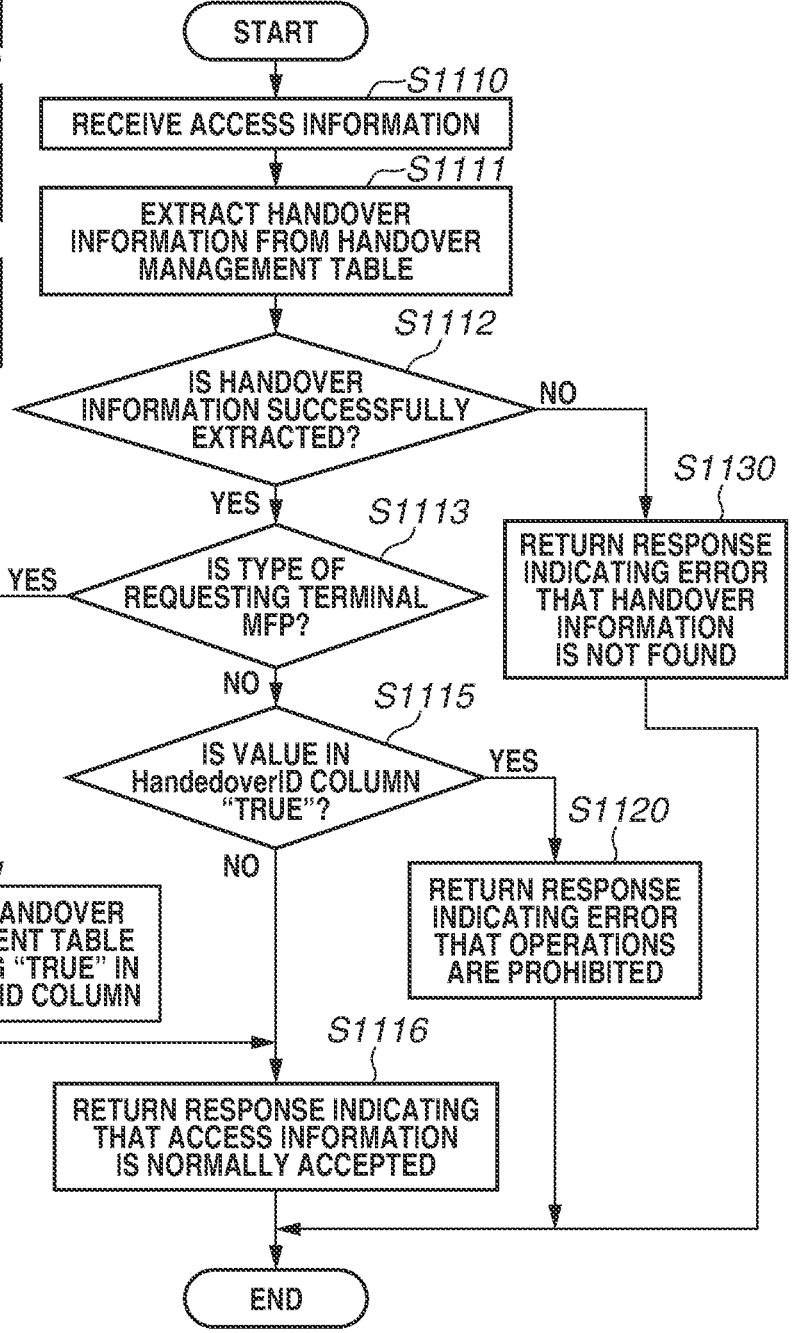

MANAGEMENT SERVER 103

MANAGEMENT SERVER 103

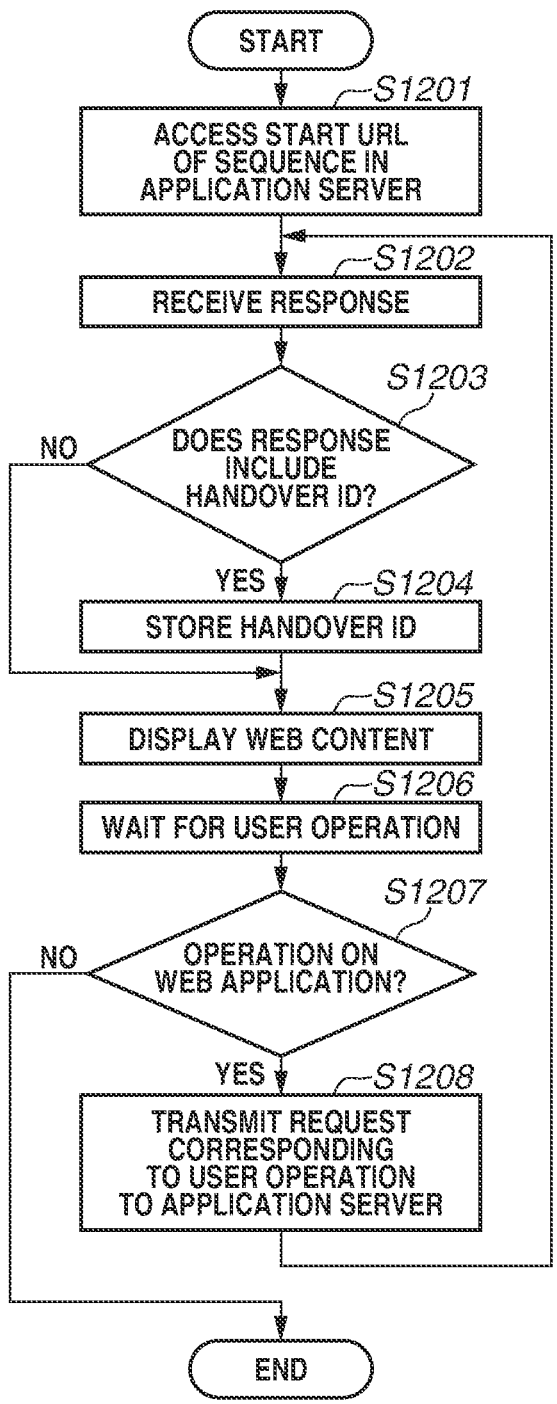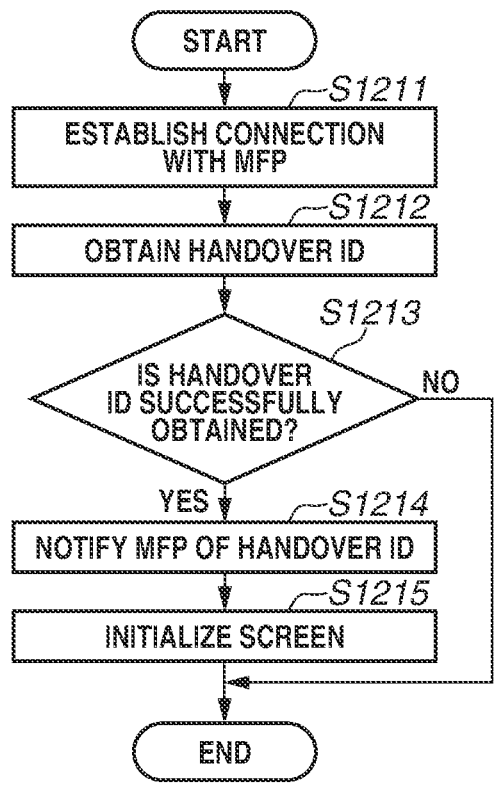

MFP 101

FIG.14

| SequenceID | SequenceData | HandoverID |
|---|---|---|
| s001 | SETTING SCREEN 1, COLOR, 300 × 300, JPEG, foo@example.com | h001 |
| s002 | PRE-EXECUTION CHECK SCREEN, MONOCHROME, 600 × 600, PDF, ¥¥server¥folder¥bar | h002 |
| ... | ... | ... |

| HandoverID (1501) | URL (1502) | HandedoverFlag (1503) |
|---|---|---|
| h001 | https://example.com/scan?id=s001 | TRUE |
| h002 | https://example.com/scan?id=s002 | FALSE |
| h003 | https://app.example.org/pr?s=seq001 | FALSE |
| ... | ... | ... |

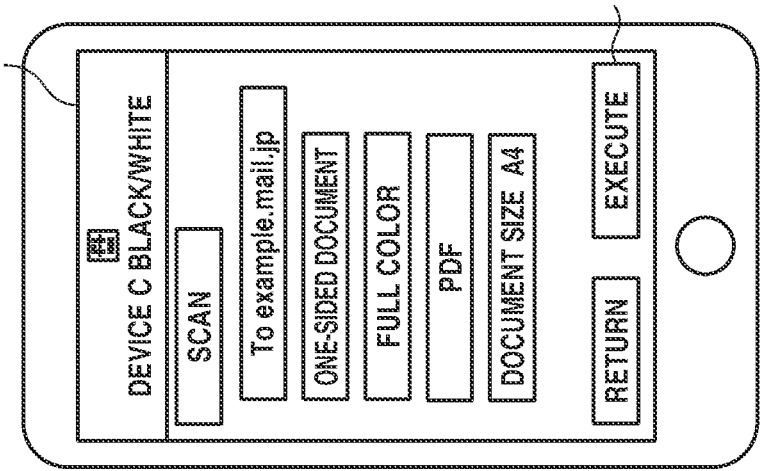
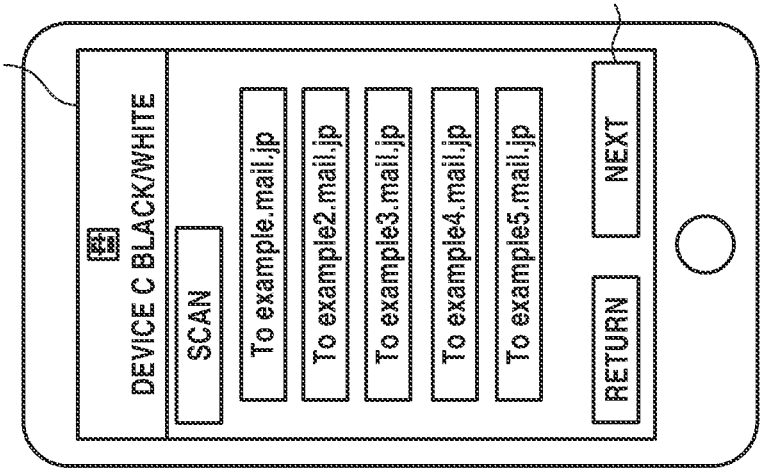
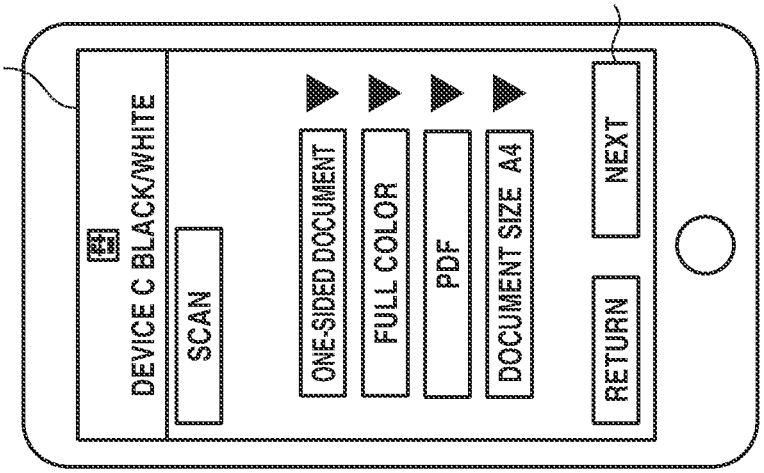

FIG. 16D  *1640*

SCAN SETTING SCREEN

- ONE-SIDED DOCUMENT ▼
- FULL COLOR ▼
- PDF ▼
- DOCUMENT SIZE A4 ▼

[RETURN]  [NEXT] — *1604*

SETTING SCREEN 1 OF MFP

FIG. 16E  *1650*

SCAN SETTING SCREEN

DESTINATION:
- To example.mail.jp
- To example2.mail.jp
- To example3.mail.jp
- To example4.mail.jp
- To example5.mail.jp

[RETURN]  [NEXT] — *1605*

SETTING SCREEN 2 OF MFP

MFP 101

FIG. 16F  *1660*

SCAN SETTING SCREEN

DESTINATION: To example.mail.jp
- ONE-SIDED DOCUMENT
- FULL COLOR
- PDF
- DOCUMENT SIZE A4

[RETURN]  [EXECUTE] — *1606*

SETTING SCREEN 3 OF MFP

INFORMATION PROCESSING SYSTEM, CONTROL METHOD, AND STORAGE MEDIUM

BACKGROUND OF THE INVENTION

Field of the Invention

The present invention relates to a technique for cooperation between a plurality of information processing apparatuses.

Description of the Related Art

In recent years, an increasing number of image processing apparatuses (such as multifunction peripherals (MFPs)) installed in offices have a function of exchanging data with a mobile terminal. For example, there have been known a technique for transmitting print data from a mobile terminal to an MFP and executing print processing by the MFP and a technique for loading image data read by a scanner of an MFP into a mobile terminal. A technique for, when an MFP performs mail transmission processing, receiving transmission setting information indicating transmission settings from a mobile terminal, reflecting the received transmission setting information, and performing the mail transmission processing has been discussed (for example, Japanese Patent Application Laid-Open No. 2017-108338). A technique that allows, if the remaining battery level of a mobile terminal becomes low in making MFP setting operations from a screen of the mobile terminal, the mobile terminal to transmit handover information to the MFP, and the MFP to display a setting screen having been opened on the mobile terminal thereon has also been discussed (for example, Japanese Patent Application Laid-Open NO. 2015-207247). In such a manner, the setting operation can be handed over between an MFP and a mobile terminal.

However, according to Japanese Patent Application Laid-Open No. 2017-108338, the timing at which the setting operation can be handed over between the mobile terminal and the MFP is limited. According to Japanese Patent Application Laid-Open No. 2015-207247, the setting operation can be handed over between the mobile terminal and the MFP even if there is a large distance between the mobile terminal and the MFP. In other words, handover can be performed against the intention of the user. The conventional techniques therefore do not always improve the convenience of the user. The present invention is directed to providing a technique for performing handover of the setting operation by the user bringing the mobile terminal close to the MFP without limiting the timing at which the setting operation can be handed over.

SUMMARY OF THE INVENTION

According to an aspect of the present invention, an information processing system includes a web server configured to provide a sequence of operation screens, an image processing apparatus configured to access the web server, and an information processing apparatus configured to access the web server. The web server includes a first memory, and a first processor in communication with the first memory. The first processor performs registering first information indicating an operation screen operated on the information processing apparatus and a status of operation, and providing a second operation screen to the image processing apparatus. The image processing apparatus includes a second memory, and a second processor in communication with the second memory. The second processor performs receiving second information corresponding to the registered first information, and displaying the second operation screen provided by the web server. In a case where the image processing apparatus and the information processing apparatus are close to each other, the second information corresponding to the registered first information is transmitted from the information processing apparatus to the image processing apparatus. The receiving includes receiving the transmitted second information, and the displaying includes displaying the second operation screen, provided by the web server, on which the status of operation is reflected, based on the registered first information corresponding to the transmitted second information.

Further features of the present invention will become apparent from the following description of exemplary embodiments with reference to the attached drawings.

BRIEF DESCRIPTION OF THE DRAWINGS

FIGS. 11A, 11B, 11C, and 11D are flowcharts illustrating processing of the management server according to the present exemplary embodiment.

FIGS. 12A and 12B are flowcharts illustrating processing of the mobile terminal according to the present exemplary embodiment.

FIG. 14 illustrates an example of a sequence management table according to the present exemplary embodiment.

FIG. 15 illustrates an example of a handover management table according to the present exemplary embodiment.

FIGS. 16A to 16F illustrate examples of user interfaces (UIs) for operation screens of a web application according to the present exemplary embodiment, with FIGS. 16A to 16C illustrating an example UI for the mobile terminal, and FIGS. 16D to F illustrating an example UI for the MFP.

DESCRIPTION OF THE EMBODIMENTS

Exemplary embodiments of the present invention will be described below with reference to the drawings.

The following exemplary embodiments are not intended to limit the inventions set forth in the claims. Not all combinations of features described in the exemplary embodiments are indispensable to the solving means of the present invention.

Figure 1:
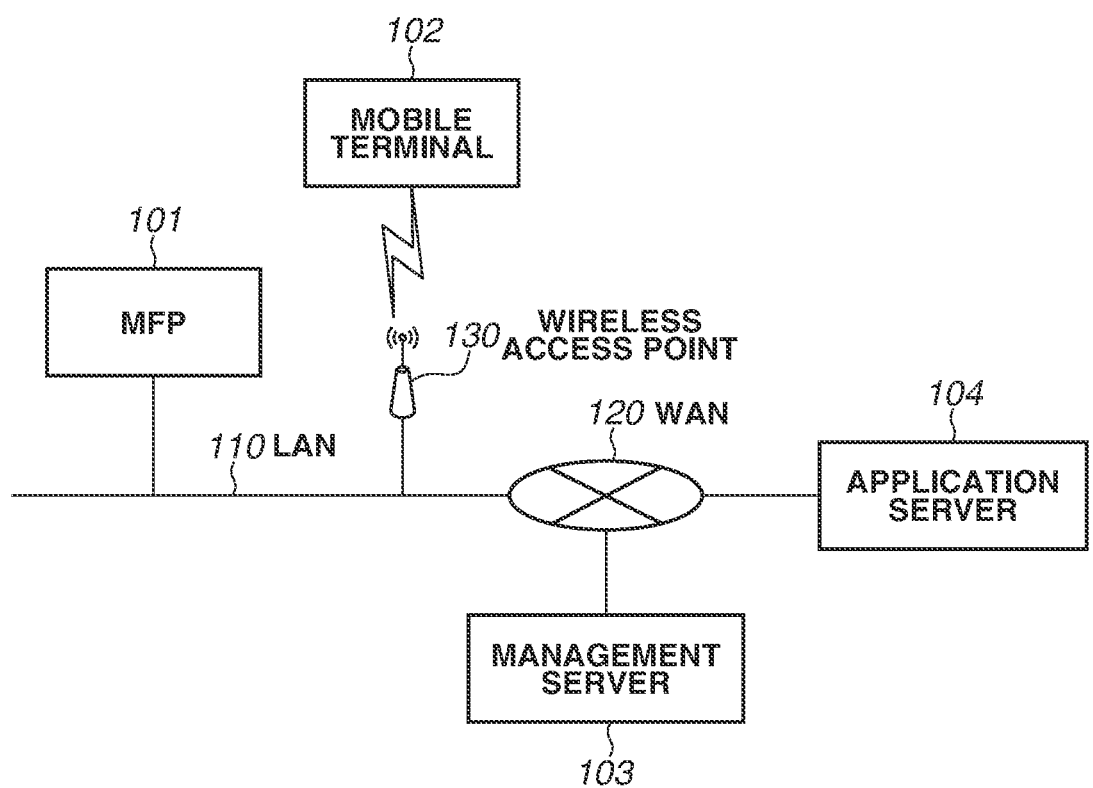
FIG. 1 is a diagram illustrating a configuration of an information processing system according to a first exemplary embodiment of the present invention.

A first exemplary embodiment will be described below. FIG. 1 is a diagram illustrating an example of a system configuration of an information processing system according to the present exemplary embodiment. The information processing system includes a multifunction peripheral (MFP) 101 connected to a local area network (LAN) 110, a mobile terminal 102 wirelessly connected to the LAN 110 via a wireless access point 130, and a management server 103 and an application server 104 connected to a wide area network (WAN) 120. The apparatuses on the LAN 110 and the apparatuses on the WAN 120 can communicate with each other via each other's networks. FIG. 1 illustrates an example of a typical network configuration, and each apparatus may be connected to either the LAN 110 or the WAN 120. The MFP 101 may be connected to the wireless access point 130.

The MFP 101 is an image processing apparatus including a scanner and a printer. While the present exemplary embodiment is described by using the MFP 101 as an example of the image processing apparatus, this is not restrictive. The image processing apparatus may be a single-function apparatus. The MFP 101 includes a web browser as an application program. While the information processing system illustrated in FIG. 1 includes only one MFP, the information processing system may include a plurality of MFPs. The mobile terminal 102 is a portable information processing apparatus. The mobile terminal 102 includes a mobile application that can display web contents. The mobile terminal 102 according to the present exemplary embodiment is assumed to be, but not limited to, a terminal device such as a smartphone and a tablet terminal. The MFP 101 and the mobile terminal 102 can perform communication by short-range wireless communication such as near field communication (NFC) and Bluetooth (registered trademark) communication. The management server 103 is a server for managing information for handing over an operation status of a web application provided by the application server 104 (described below) from the mobile terminal 102 to the MFP 101. The application server 104 is a web server that provides the web application. The provided web application can be accessed from the MFP 101 and the mobile terminal 102. By accessing the application server 104, the MFP 101 and the mobile terminal 102 display an operation screen of the web application and return operation content received on the operation screen to the application server 104. The present exemplary embodiment is characterized in that the status of the web application operated on the mobile terminal 102 can be handed over to the MFP 101. The number of application servers is not limited to one, and there may be a plurality of application servers corresponding to the number of web applications to be used.

Figure 2:
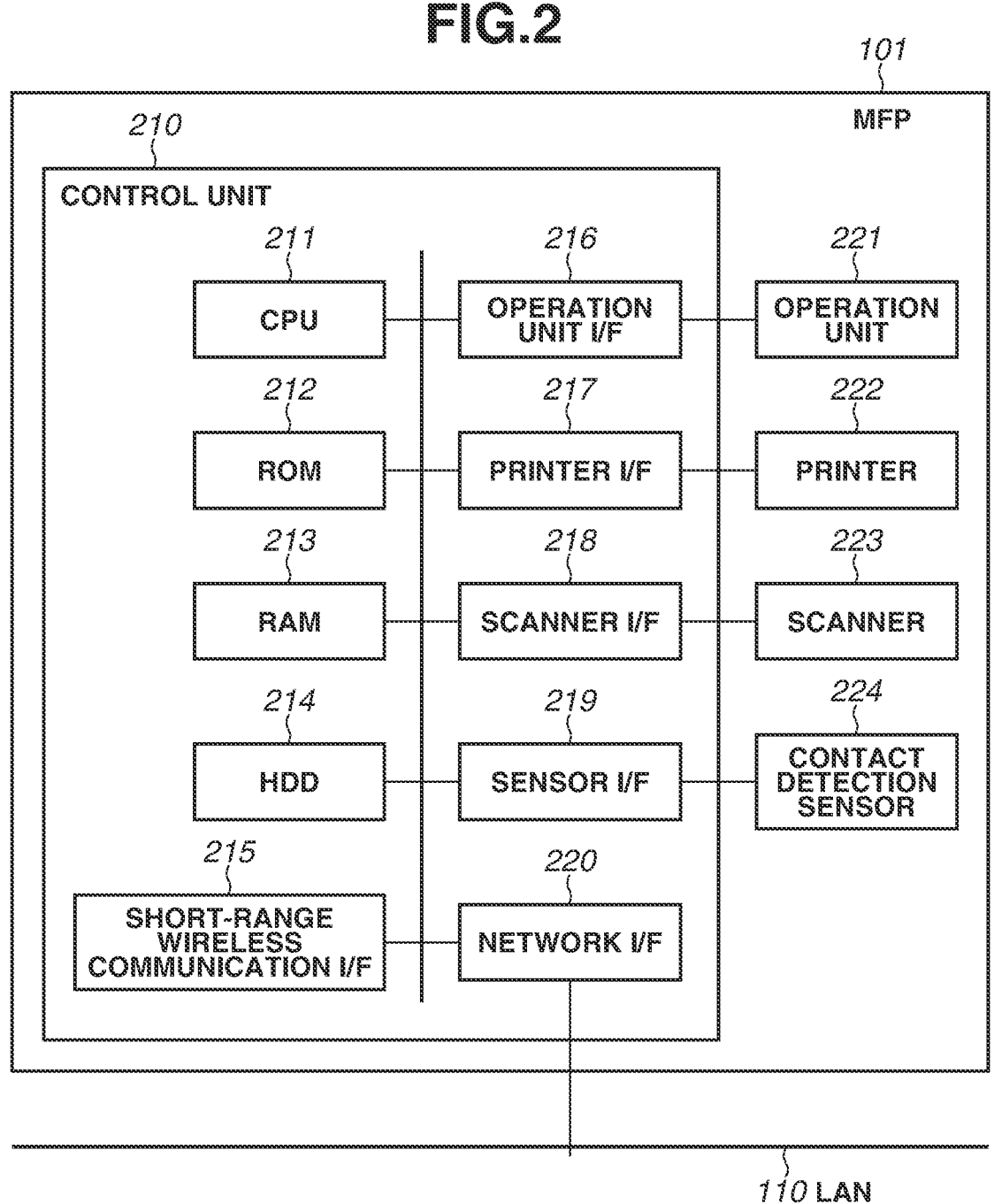
FIG. 2 is a block diagram illustrating a hardware configuration of a multifunction peripheral (MFP) according to the present exemplary embodiment.

FIG. 2 is a block diagram illustrating a hardware configuration of the MFP 101. A control unit 210 including a central processing unit (CPU) 211 controls operation of the entire MFP 101. The CPU 211 reads control programs stored in a read-only memory (ROM) 212 and a hard disk drive (HDD) 214 and performs various types of control processing such as read control and transmission control. A random access memory (RAM) 213 is used as a temporary storage area such as a main memory and a work area of the CPU 211. The HDD 214 stores image data and various programs including an installed application program. A short-range wireless communication interface (I/F) 215 is an I/F for short-range wireless communication such as NFC and Bluetooth (registered trademark) communication. The short-range wireless communication I/F 215 communicates with and exchanges data with the mobile terminal 102. The CPU 211 serves as an obtaining unit configured to notify the management server of the received second information.

An operation unit I/F 216 connects an operation unit 221 with the control unit 210. The operation unit 221 includes a liquid crystal display unit having a touch panel function and a keyboard. A printer I/F 217 connects a printer 222 with the control unit 210. Image data to be printed by the printer 222 is transferred from the control unit 210 to the printer 222 via the printer I/F 217, and printed on a recording medium by the printer 222. A scanner I/F 218 connects a scanner 223 with the control unit 210. The scanner 223 reads an image on a document to generate image data, and inputs the image data to the control unit 210 via the scanner I/F 218. A sensor I/F 219 connects a contact detection sensor 224 with the control unit 210. The contact detection sensor 224 is a sensor for detecting whether the mobile terminal 102 is in contact at a predetermined position on the MFP 101. In the present exemplary embodiment, the MFP 101 includes a mobile terminal placing spot (not illustrated) for the mobile terminal 102 to be placed on. The contact detection sensor 224 detects whether the mobile terminal 102 is placed on the mobile terminal placing spot. A network I/F 220 connects the control unit 210 (MFP 101) to the LAN 110. The network I/F 220 transmits and receives various types of information to/from other apparatuses on the LAN 110 or the WAN 120. The network I/F 220 serves as a receiving unit, configured to receive second information corresponding to the first information registered by a registering unit from the information processing apparatus. The operation unit I/F 216 serves as a displaying unit configured to display the second operation screen provided by a providing unit. The detection sensor 224 serves as a detecting unit configured to detect whether the information processing apparatus is placed at a predetermined position.

Figure 3:
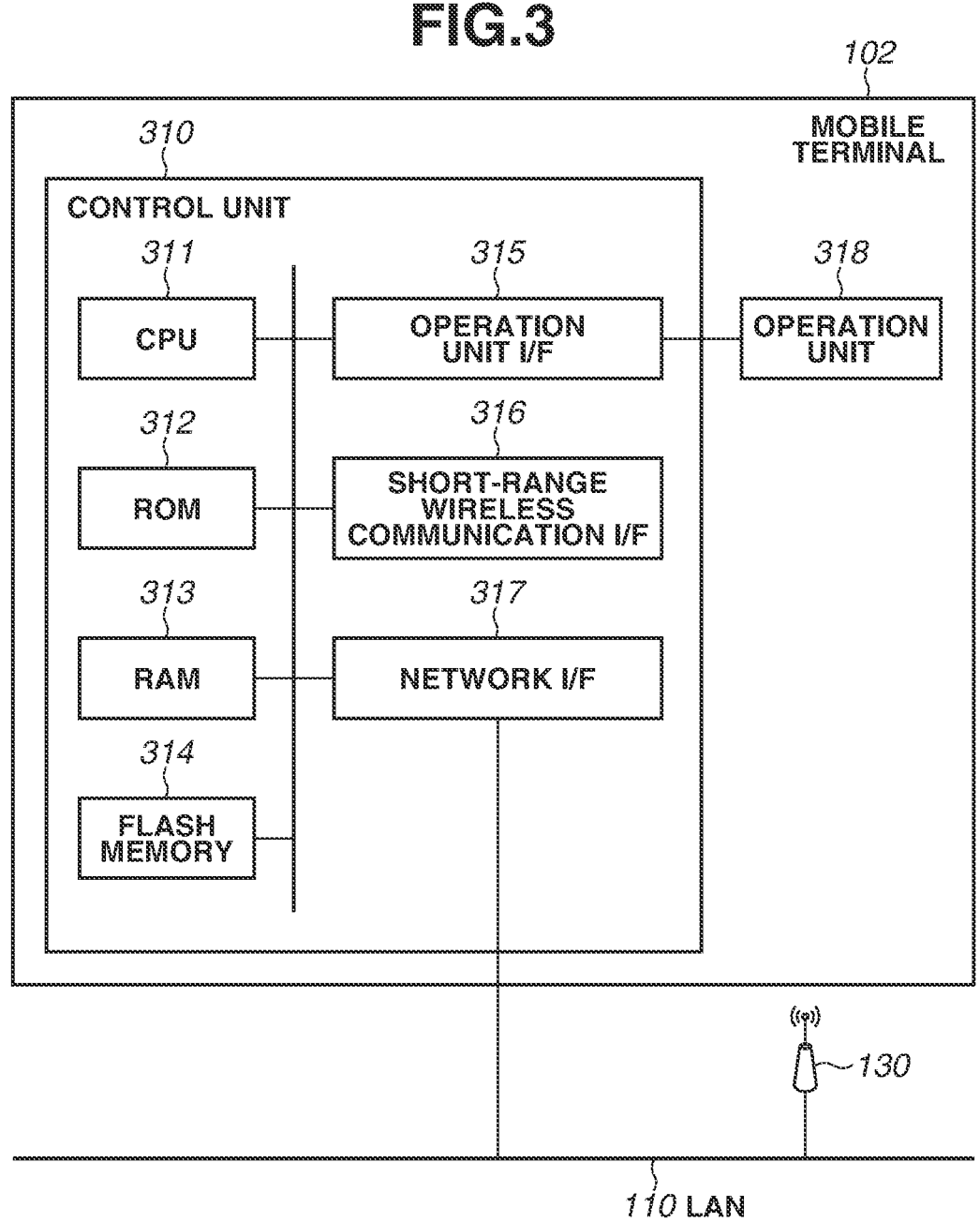
FIG. 3 is a block diagram illustrating a hardware configuration of a mobile terminal according to the present exemplary embodiment.

FIG. 3 is a block diagram illustrating a hardware configuration of the mobile terminal 102. A control unit 310 including a CPU 311 controls operation of the entire device. The CPU 311 reads control programs stored in a ROM 312 and a flash memory 314 and performs various types of control processing. A RAM 313 is used as a temporary storage area such as a main memory and a work area of the CPU 311. The flash memory 314 stores various programs and data.

An operation unit I/F 315 connects an operation unit 318 with the control unit 310. The operation unit 318 includes a liquid crystal display unit having a touch panel function. A short-range wireless communication I/F 316 is an I/F for short-range wireless communication such as NFC and Bluetooth (registered trademark) communication. The short-range wireless communication I/F 316 communicates with and exchanges data with the MFP 101. A network I/F 317 connects the control unit 310 to the LAN 110 via the wireless access point 130. The network I/F 317 is capable of wireless communication. The network I/F 317 transmits and receives various types of information to/from other apparatuses on the WAN 120 or the LAN 110 by wireless communication.

Figure 4:
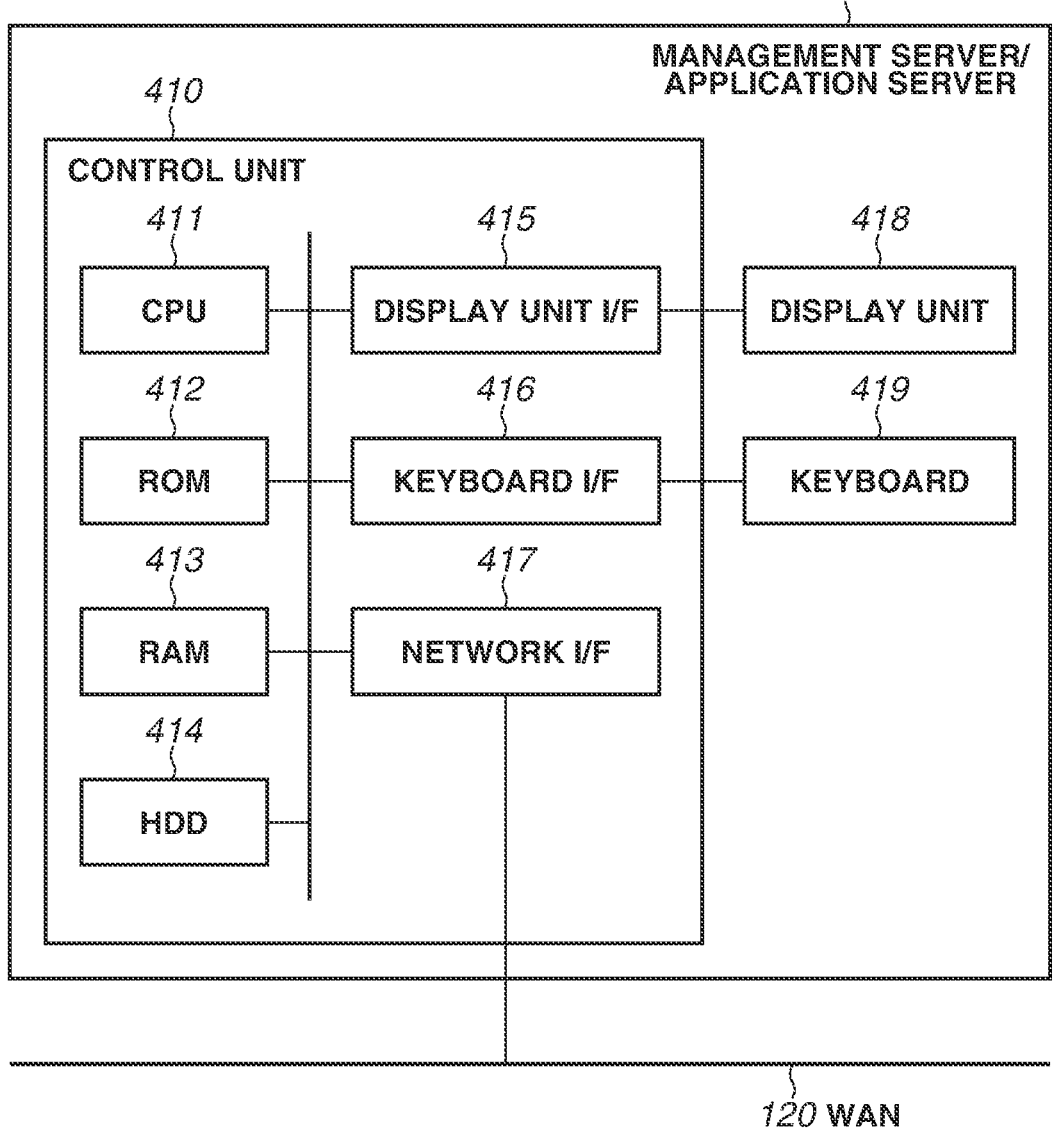
FIG. 4 is a block diagram illustrating a hardware configuration of a management server and an application server according to the present exemplary embodiment.

FIG. 4 is a block diagram illustrating a hardware configuration of the management server 103 and the application server 104. A control unit 410 including a CPU 411 controls operation of the entire apparatus. The CPU 411 reads control programs stored in a ROM 412 and an HDD 414 and performs various types of control processing. A RAM 413 is used as a temporary storage area such as a main memory and a work area of the CPU 411. The HDD 414 stores various programs and data. The RAM 413 or HDD 414 of the application server 104 serves as a registration unit configured to register first information indicating: a first operation screen operated on the information processing apparatus, and a status operation. The CPU 411 of the application server 104 serves as an updating unit and an instructing unit. The updating unit 411 is configured to update the first information registered by the registering unit 413 each time the operation screen transitions based on a user operation. The instructing unit 411 is configured to give an instruction to register handover information associated with the first information registered by the registering unit 413.

A display unit I/F 415 connects a display unit 418 with the control unit 410. A keyboard I/F 416 connects a keyboard 419 with the control unit 410. The CPU 411 recognizes instructions given by the user via the keyboard 419, and makes a screen displayed on the display unit 418 transition based on the recognized instructions. A network I/F 417 connects the control unit 410 to the WAN 120. The network I/F 417 transmits and receives various types of information to/from other apparatuses on the WAN 120 or the LAN 110. The network IF 417 of the application server 104 serves as a providing unit configured to provide a second operation screen.

Figure 5:
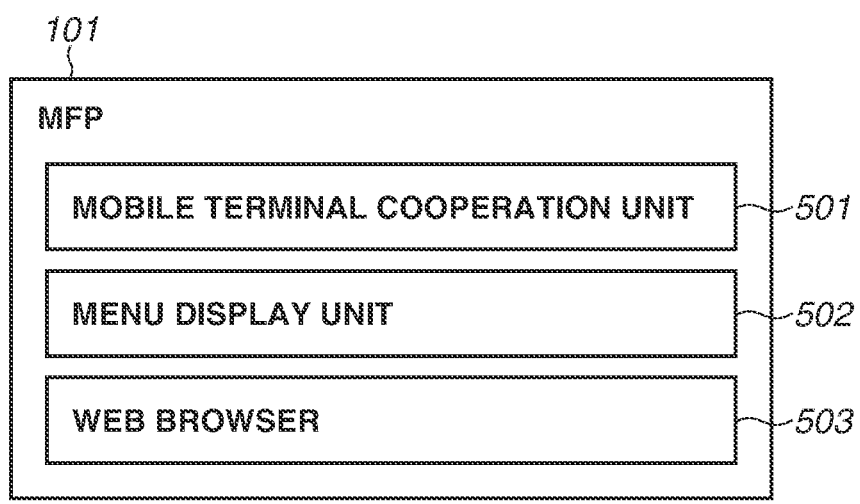
FIG. 5 is a block diagram illustrating a software configuration of the MFP according to the present exemplary embodiment.

FIG. 5 is a software configuration diagram of the MFP 101 according to the present exemplary embodiment. This software configuration diagram is a functional block diagram of software implemented by the CPU 211 of the MFP 101 reading programs stored in the ROM 212 and the HDD 214 into the RAM 213 and executing the programs.

A mobile terminal cooperation unit 501 performs processing for cooperating with the mobile terminal 102. For example, the mobile terminal cooperation unit 501 detects that the mobile terminal 102 is placed on the mobile terminal placing spot by using the contact detection sensor 224, and communicates with the mobile terminal 102 by using the short-range wireless communication I/F 215. Here, the term "cooperation" refers to a state where the MFP 101 and the mobile terminal 102 can communicate with and exchange data with each other. The term will hereinafter be used for the same meaning.

A menu display unit 502 displays buttons (hereinafter, application buttons) for calling applications on a menu screen. The application buttons are buttons for calling various functions such as an application installed on the MFP 101 and a web application.

A web browser 503 accesses a web server to obtain web content. The MFP 101 may include other functions that are not illustrated in the drawings.

Figure 6:
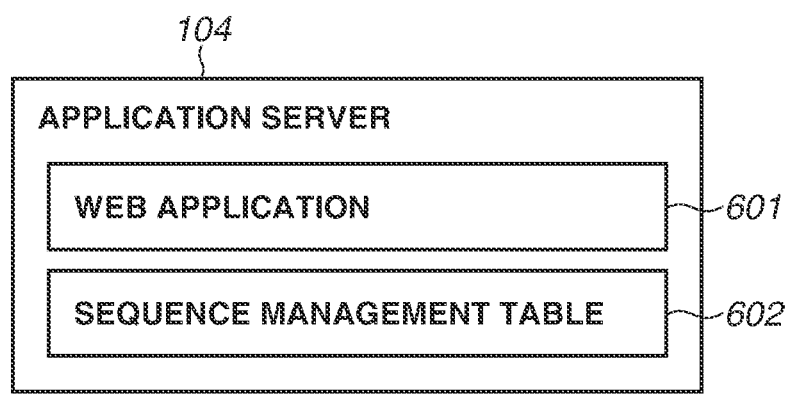
FIG. 6 is a block diagram illustrating a software configuration of the application server according to the present exemplary embodiment.

FIG. 6 is a software configuration diagram of the application server 104 according to the present exemplary embodiment. This software configuration diagram is a functional block diagram of software implemented by the CPU 411 of the application server 104 reading programs stored in the ROM 412 and the HDD 414 into the RAM 413 and executing the programs.

A web application 601 is a program running on the application server 104. The web application 601 provides a screen (operation screen) for operating the web application 601 to the MFP 101 and the mobile terminal 102, and the MFP 101 and the mobile terminal 102 display the operation screen on a web browser. The MFP 101 and the mobile terminal 102 display the operation screen of the web application 601 by accessing the application server 104, accept the user's operations on the operation screen, and return the content of the accepted operations to the application server 104. For example, in a case where the web application 601 instructs the MFP 101 to execute a scan, the user accesses the application server 104 via a web browser and makes settings on an operation screen for scan setting, provided by the web application 601 (in the present exemplary embodiment, the user accesses the application server 104 a plurality of times and makes settings on a plurality of operation screens). The user can then give a scan execution instruction on an operation screen for scan execution, provided by the web application 601. Thus, application server (web server) 104 is configured to provide a sequence of operation screens.

A sequence management table 602 is a table for managing situations (operation history) in a series of processes (hereinafter, sequence) where the user operates the web application 601 via a web browser. The sequence refers to a procedure involving screen transition from a start to end of processing defined for each web application. For example, a sequence for a scan application ranges from an instruction for making scan settings to an instruction for executing the scan. The application server 104 may include other functions that are not illustrated in FIG. 6.

FIG. 14 illustrates an example of the sequence management table 602 according to the present exemplary embodiment. The sequence management table 602 includes three columns 1401 to 1403.

A SequenceID column 1401 is a column containing identification information (hereinafter, "sequence identifier (ID)") for uniquely identifying a piece of sequence information. Sequence information is information including information defined in the columns 1401 to 1403. The values in the SequenceID column 1401 also serve as IDs for uniquely specifying the rows of the sequence management table 602. In the following description, the values in the SequenceID column 1401 are used to designate the rows of the sequence management table 602. For example, the row where the value of the SequenceID column 1401 is "s001" will be referred to as "row s001".

A SequenceData column 1402 is a column describing the operation status at a point in time indicated by the SequenceID column 1401 in the sequence. The SequenceData column 1402 stores information (hereinafter, "sequence operation status data") to be used to identify and restore an operation status of the sequence. Examples of the information to be used include an ID of an operation screen, a setting value set before the operation screen, and an operation history.

A HandoverID column 1403 contains an ID (hereinafter, "handover ID") for uniquely identifying a row of a handover management table 702 to be described below. The HandoverID column 1403 links the sequence management table 602 to the handover management table 702.

Figure 7:
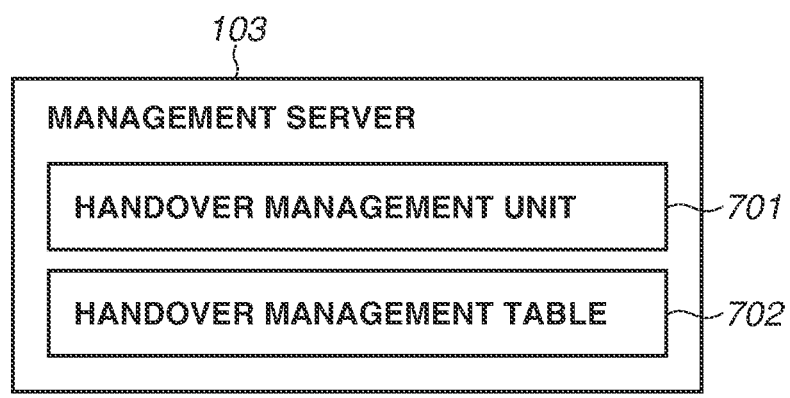
FIG. 7 is a block diagram illustrating a software configuration of the management server according to the present exemplary embodiment.

FIG. 7 is a software configuration diagram of the management server 103 according to the present exemplary embodiment. This software configuration diagram is a functional block diagram of software implemented by the CPU 411 of the management server 103 reading programs stored in the ROM 412 and the HDD 414 into the RAM 413 and executing the programs.

A handover management unit 701 manages information (hereinafter, "handover information") for handing over the sequence of the web application 601 from the mobile terminal 102 to the MFP 101. The handover management table 702 is a table where the handover information is recorded. The handover management unit 701 and the handover management table 702 do not need to be included in the management server 103. For example, the handover management unit 701 and the handover management table 702 may be included in the application server 104. The management server 103 may include other functions that are not illustrated in FIG. 7.

FIG. 15 illustrates an example of the handover management table 702 according to the present exemplary embodiment. The handover management table 702 includes three columns 1501 to 1503.

A HandoverID column 1501 is a column for defining an ID for uniquely identifying a piece of handover information, and corresponds to the HandoverID column 1403 of the sequence management table 602. The values in the HandoverID column 1501 also serve as IDs for uniquely specifying the rows of the handover management table 702. In the following description, the values in the HandoverID column 1501 are used to designate the rows of the handover management table 702. For example, the row where the value of the HandoverID column 1501 is "h001" will be referred to as "row h001".

A Uniform Resource Locator (URL) column 1502 contains a URL (hereinafter, "handover URL") for the web browser 503 of the MFP 101 to access in handing over the sequence of the web application 601 to the MFP 101. The values in the URL column 1502 are the URLs of web applications, which vary from one web application to another. For example, in the present exemplary embodiment, the URL of a web application to which the value in the SequenceID column 1401 is attached as a query string is used as a handover URL. Since the value in the SequenceID column 1401 indicates the operation status of the sequence, the handover URL enables identification and restoration of the operation status of the sequence of the target web application.

A HandedoverFlag column 1503 lists flags indicating whether the target sequences have been handed over to the MFP 101. A value "TRUE" in the HandedoverFlag column 1503 indicates that the target sequence has been handed over. Other values than "TRUE" indicate that the target sequence has not been handed over.

Figure 8:
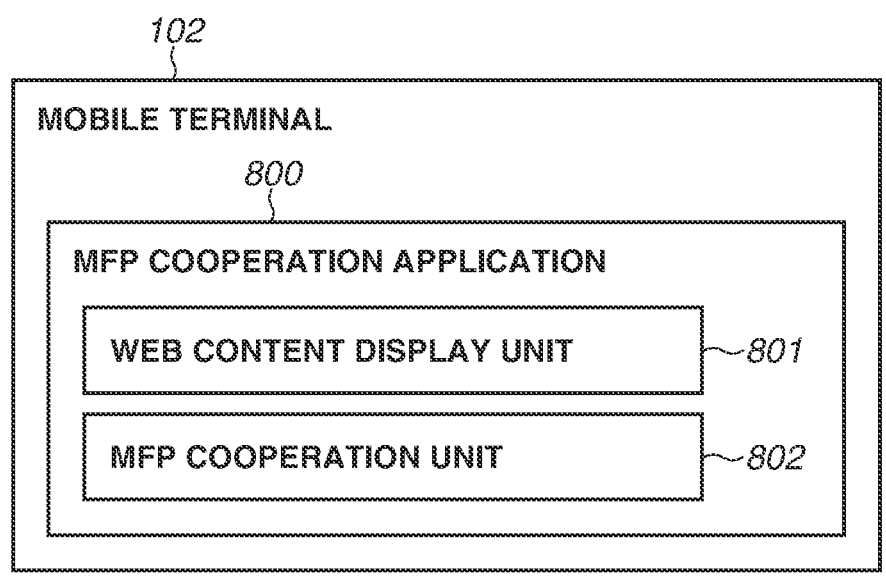
FIG. 8 is a block diagram illustrating a software configuration of the mobile terminal according to the present exemplary embodiment.

FIG. 8 is a software configuration diagram of the mobile terminal 102 according to the present exemplary embodiment. This software configuration diagram is a functional block diagram of software implemented by the CPU 311 of the mobile terminal 102 reading programs stored in the ROM 312 and the flash memory 314 into the RAM 313 and executing the programs.

An MFP cooperation application 800 is an application for handing over operations to the MFP 101, and includes a web content display unit 801 and an MFP cooperation unit 802. The web content display unit 801 accesses the application server 104 and displays web content. The MFP cooperation unit 802 performs processing for exchanging data with the MFP 101 by using the short-range wireless communication I/F 215.

Figure 9:
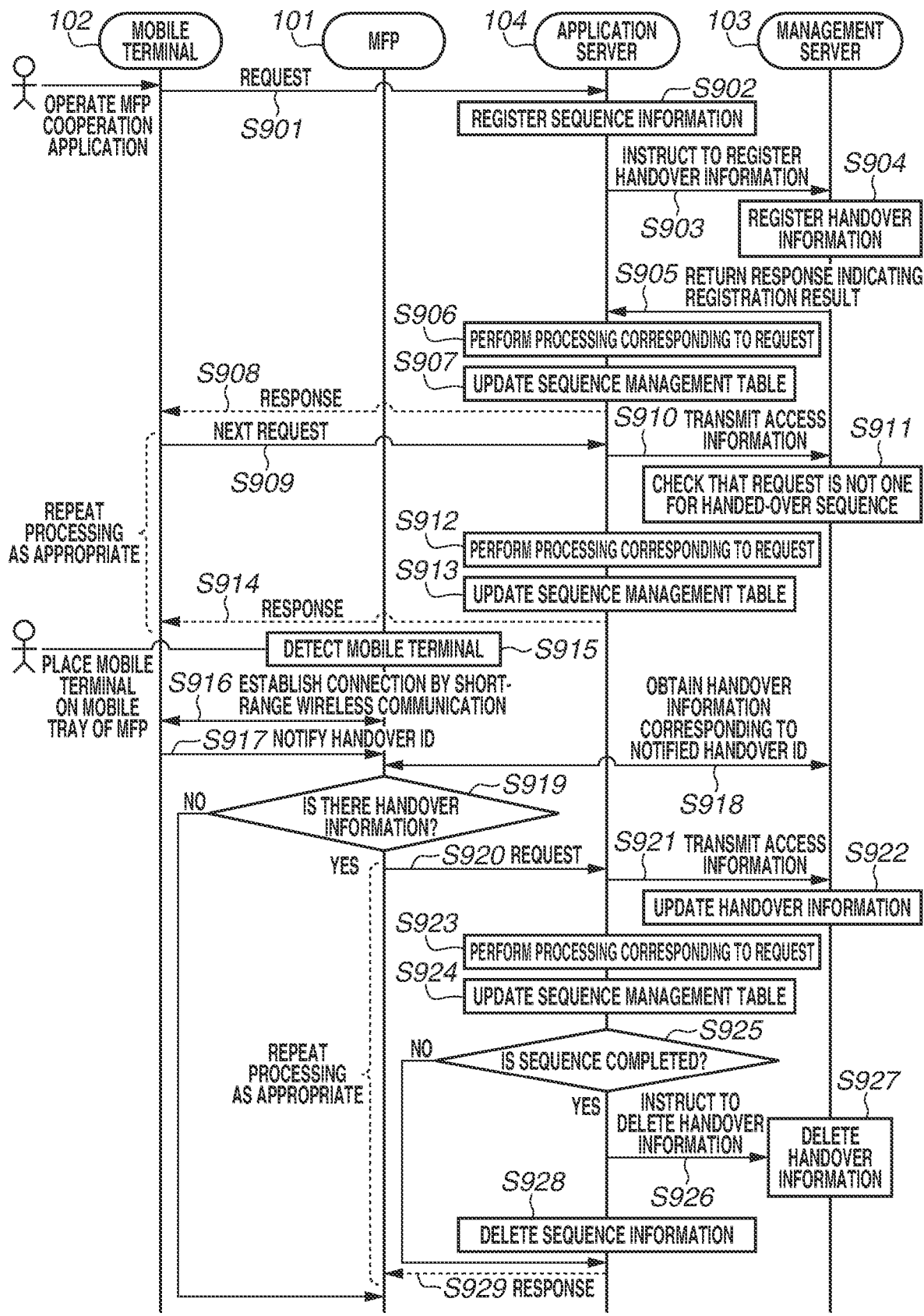
FIG. 9 is a sequence diagram illustrating a flow of a series of processes performed by the information processing system according to the present exemplary embodiment.

Before describing the sequence diagram of FIG. 9, operation setting handover according to the present exemplary embodiment will be outlined with reference to FIGS. 16A to 16F. The following description is given by using the following case as an example: the mobile terminal 102 and the MFP 101 can execute a web application that can give an instruction to transmit data generated by the MFP 101 scanning a document to a destination designated by user operations, and the settings of the web application are made on a screen of the mobile terminal 102 or the MFP 101. FIGS. 16A to 16C are diagrams illustrating a transition of a setting screen of the mobile terminal 102. FIG. 16A illustrates a setting screen 1 (screen 1610) initially displayed when the web application is accessed. If a "NEXT" button 1601 is pressed, the screen transitions to a setting screen 2 (screen 1620) illustrated in FIG. 16B. If the user makes settings on the setting screen 2 and then presses a "NEXT" button 1602, the screen transitions to a setting screen 3 (screen 1630) illustrated in FIG. 16C. If an "EXECUTE" button 1603 is pressed, the mobile terminal 102 transmits a scan execution instruction to the MFP 101. FIGS. 16D to 16F are diagrams illustrating a transition of a setting screen of the MFP 101. FIGS. 16D to 16F illustrate similar setting screens to those illustrated in FIGS. 16A to 16C, with a similar screen transition. Suppose, for example, that the user makes settings on the setting screen 1 of FIG. 16A on the mobile terminal 102, and then presses the "NEXT" button 1601 to open the setting screen 2 of FIG. 16B and places the mobile terminal 102 on the mobile terminal placing spot of the MFP 101 to start short-range wireless communication between the MFP 101 and the mobile terminal 102. In such a case, the user can continue to make settings on a setting screen 2 (screen 1650) of FIG. 16E on the MFP 101. If the setting screen 1 of FIG. 16A or the setting screen 3 of FIG. 16C is open on the mobile terminal 102, the user can similarly continue to make settings on a setting screen 1 (screen 1640) of FIG. 16D or a setting screen 3 (screen 1660) of FIG. 16F on the MFP 101. If the user advances the handed-over setting screen on the MFP 101 and presses an "EXECUTE" button 1606 on setting screen 3 of FIG. 16F, the MFP 101 executes a scan and transmits a mail to the specified destination.

FIG. 9 is a sequence diagram illustrating a flow of a series of processes that the MFP 101, the mobile terminal 102, the management server 103, and the application server 104 according to the present exemplary embodiment perform in a cooperative manner. FIG. 9 illustrates an example where the web application 601 provided by the application server 104 is operated by using the mobile terminal 102 and then the sequence is handed over to the MFP 101.

The application server 104 is a server that provides the web application 601. The web application 601 is called by the MFP 101 or the mobile terminal 102. The management server 103 is a server used to manage information for handing over the operation status of the web application 601 from the mobile terminal 102 to the MFP 101.

In step S901, the mobile terminal 102 receives the user's instruction to access the web application 601 and accesses the application server 104. Here, the MFP cooperation application 800 sends a request by using a start URL with which the sequence is started. The request here refers to processing for requesting the operation screen (setting screen) of FIG. 16A.

In step S902, the application server 104 registers new sequence information in the sequence management table 602. The sequence information here includes status data on a sequence operation and a sequence ID. In step S903, the application server 104 transmits the URL of the web application 601 being accessed by the mobile terminal 102 and the sequence ID to the management server 103, and instructs the management server 103 to register handover information. In step S904, the management server 103 registers new handover information in the handover management table 702. In step S905, the management server 103 returns a response indicating a registration result of the handover information to the application server 104. The response includes a handover ID from which the new handover information issued in step S904 can be uniquely identified. In the present exemplary embodiment, the handover ID is issued by the management server 103. However, this is not restrictive. For example, the handover ID may be issued by the mobile terminal 102. In such a case, the mobile terminal 102 includes information unique to the mobile terminal 102 (such as a Media Access Control (MAC) address) into the query string in accessing the web application 601, and notifies the application server 104 and the management server 103 of the information.

In step S906, the application server 104 performs processing corresponding to the request made in step S901. The application server 104 identifies the situation in the sequence from the sequence information, and performs processing appropriate to the request, i.e., generates the setting screen of FIG. 16A in response to a screen acquisition request. In step S907, the application server 104 updates the sequence management table 602 with sequence information on which the processing performed in step S906 is reflected. Specifically, the application server 104 adds a value to or updates the value in the SequenceData column 1402 of the sequence management table 602 based on the request. In step S908, the application server 104 returns a response to the request made in step S901 to the mobile terminal 102 (displays the setting screen of FIG. 16A). Here, the handover ID is included as part of the response.

In step S909, the mobile terminal 102 receives the user's instructions (the user makes settings on the setting screen 1 of FIG. 16A and presses the "NEXT" button 1601), and transmits the next request to the application server 104. The request includes information (handover ID) indicating the sequence.

In step S910, the application server 104 transmits access information including a request URL to the management server 103. In step S911, upon receiving the access information, the management server 103 checks that the request made in step S909 is not one for a handed-over sequence.

In step S912, the application server 104 performs processing corresponding to the request made in step S909. The application server 104 identifies the situation in the sequence based on the sequence information included in the request, and performs processing appropriate to the request, i.e., records settings such as "one-sided documents" and "full color" made on the setting screen of FIG. 16A, and generates the setting screen of FIG. 16B. In step S913, the application server 104 updates the sequence management table 602 with the sequence information on which the processing performed in step S912 is reflected (setting information such as "one-sided document" and "full color" set on the setting screen of FIG. 16A). In step S914, the application server 104 returns a response to the request made in step S909 to the mobile terminal 102 (displays the setting screen of FIG. 16B). Here, the handover ID is included as part of the response.

The processing from step S909 to step S914 is performed each time the mobile terminal 102 accepts the user's operations on the MFP cooperation application 800 and accesses the application server 104 to make a request (in the following description, setting screen 2 of FIG. 16B is assumed to be displayed on the mobile terminal 102 here).

The following description will be given on the assumption that the user has placed the mobile terminal 102 on the mobile terminal placing spot of the MFP 101.

In step S915, the MFP 101 detects that the mobile terminal 102 is placed on the mobile terminal placing spot by using the contact detection sensor 224. In step S916, the MFP 101 and the mobile terminal 102 establish a connection by short-range wireless communication. In step S917, the mobile terminal 102 notifies the MFP 101 of the handover ID of the MFP cooperation application 800 that is being operated.

In step S918, the MFP 101 obtains handover information corresponding to the handover ID notified in step S917 from the handover management table 702 in the management server 103. In step S919, the MFP 101 determines whether there is handover information. If there is handover information (YES in step S919), the processing proceeds to step S920. If there is no handover information (NO in step S919), the processing is ended.

In step S920, the MFP 101 accesses a handover URL included in the handover information obtained in step S918 by using the web browser 503 (makes an acquisition request for the setting screen of FIG. 16E).

In step S921, the application server 104 transmits access information to the management server 103. In step S922, the management server 103 updates the handover information in the handover management table 702. Specifically, the management server 103 updates the value in the HandedoverFlag column 1503 with "TRUE".

In step S923, the application server 104 performs processing corresponding to the request made in step S920. The application server 104 refers to the sequence management table 602 based on the sequence information included in the handover information, identifies the situation in the sequence (operation screen and operation history), and performs processing appropriate to the request, i.e., in response to the acquisition request for the setting screen of FIG. 16E, stores the operation history and generates the setting screen of FIG. 16E on which the operation history is reflected. In step S924, the application server 104 updates the sequence management table 602 with the sequence information on which the processing performed in step S923 is reflected.

In step S925, the application server 104 determines whether the sequence is completed. If the sequence is completed (YES in step S925), the processing proceeds to step S926. If the sequence is not completed (NO in step S925), the processing proceeds to step S929.

In step S929, the application server 104 returns a response to the request made in step S920 to the MFP 101, i.e., displays the setting screen of FIG. 16E. This response may include the handover ID. The processing of steps S920 to S929 is performed each time the MFP 101 receives the user's operation on the web browser 503 and makes a request to the application server 104. The processing for making a request in step S920 for the second and subsequent times is performed based on the user's instruction via the MFP 101. For example, the user presses a "NEXT" button 1605 on the setting screen of FIG. 16E to make an acquisition request for the setting screen 3 of FIG. 16F. The user presses the "EXECUTE" button 1606 on the setting screen of FIG. 16F to instruct the MFP 101 to execute a scan. Given the execution instruction, the MFP 101 executes a scan under the set condition. In step S925, if the sequence is completed (if the user presses the "EXECUTE" button 1606 on the setting screen of FIG. 16F) (YES in step S925), the processing proceeds to step S926. In step S926, the application server 104 instructs the management server 103 to delete the handover information. In step S927, the management server 103 deletes the corresponding handover information from the handover management table 702.

In step S928, the application server 104 deletes the sequence information from the sequence management table 602. Here, the handover ID corresponding to the deleted handover information may be deleted from the mobile terminal 102.

While the web browser 503 is described to be automatically activated if there is handover information obtained by the MFP 101 in step S919, this is not restrictive. A button for calling handover information may be displayed as one of the application buttons on the menu screen, and the web browser 503 may be configured to be activated by the user pressing the button. In the sequence diagram, the detection of the mobile terminal 102 by the contact detection sensor 224 and the establishment of the short-range wireless communication trigger the subsequent processing. For example, if the contact detection sensor 224 detects that the mobile terminal 102 is placed on the mobile terminal placing spot, the MFP 101 issues a Bluetooth (registered trademark) beacon. If the mobile terminal 102 receives the beacon and the radio field intensity of the beacon is higher than or equal to a predetermined value, the mobile terminal 102 establishes a Bluetooth (registered trademark) communication and then the processing proceeds to the next step. This provides the effect that the operation can be handed over only when the mobile terminal 102 is on the mobile terminal placing spot of the MFP 101. The mobile terminal placing spot is used as a unit for determining that the mobile terminal 102 is located near the MFP 101. However, the mobile terminal placing spot is may not be provided in the MFP 101, and any configuration may be used as long as the mobile terminal 102 and the MFP 101 can be found to be close to each other. For example, if the MFP 101 issues a Bluetooth (registered trademark) beacon, the mobile terminal 102 may receive the beacon and determines that the MFP 101 is at a close distance based on the radio field intensity of the beacon. If the MFP 101 is determined to be at a close distance, the mobile terminal 102 may establish a Bluetooth (registered trademark) communication and transmit the handover ID to the MFP 101. The mobile terminal 102 may receive wireless LAN connection information from the MFP 101 by using Bluetooth (registered trademark) packets, establish a wireless LAN communication with the MFP 101 by using the wireless LAN connection information, and then transmit the handover ID to the MFP 101 by the established wireless LAN communication. Taking advantage of the characteristic that NFC communication can only be performed between apparatuses communicating at a sufficiently close distance, the mobile terminal 102 may determine that the MFP 101 is at a close distance based on successful establishment of NFC communication. The mobile terminal 102 may receive the wireless LAN connection information from the MFP 101 by using NFC communication, establish a wireless LAN communication with the MFP 101 based on the wireless LAN connection information, and then transmit the handover ID to the MFP 101 by the established wireless LAN communication. Moreover, if the MFP 101 includes an NFC tag reader, the handover ID may be notified by writing the handover ID to an NFC tag of the mobile terminal 102, facing the mobile terminal 102 toward the MFP 101, and the NFC tag reader of the MFP 101 reading the handover ID. The MFP 101 thus receives the handover ID if the mobile terminal 102 is located near the MFP 101.

The effect of the sequence diagram will be described. If the mobile terminal 102 approaches the MFP 101, the operation status of the web application 601 executed halfway on the mobile terminal 102 can be handed over to the MFP 101.

Figure 10:
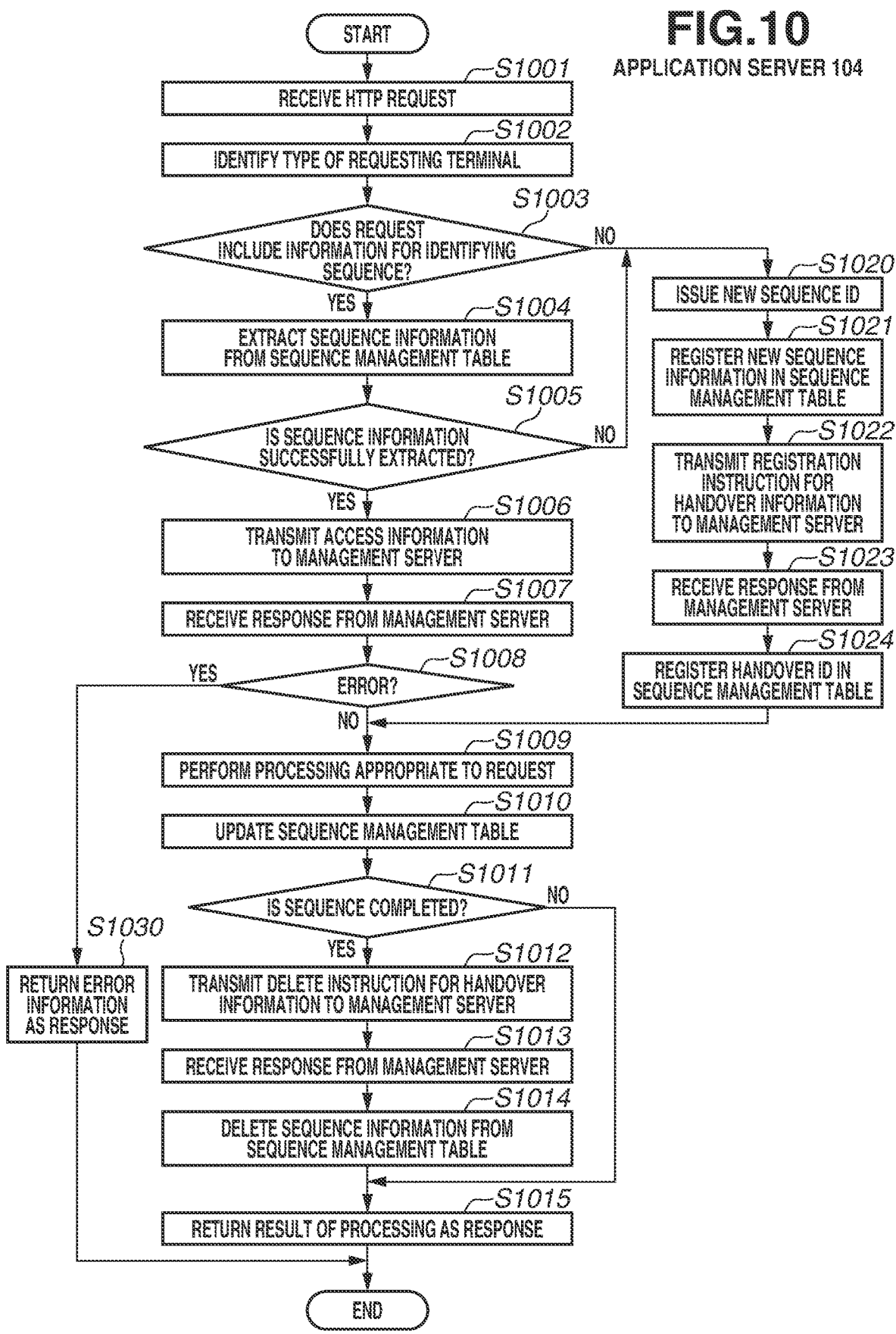
FIG. 10 is a flowchart illustrating processing of the application server according to the present exemplary embodiment.

FIG. 10 is a flowchart for describing processing of the application server 104 according to the present exemplary embodiment. FIG. 10 illustrates processing from reception of a request from the web browser of the MFP 101 or the mobile terminal 102 to returning of a response. The flowchart of FIG. 10 corresponds to the processing that the application server 104 performs in the series of processes illustrated in the sequence diagram of FIG. 9. The steps in the flowchart of FIG. 10 are implemented by the CPU 411 of the application server 104 reading a program stored in the HDD 414 into the RAM 413 and executing the program.

In step S1001, the web application 601 receives a Hypertext Transfer Protocol (HTTP) request from the web browser of the MFP 101 or the mobile terminal 102. In the following description of the flowchart, the term "request" refers to the HTTP request received in step S1001.

In step S1002, the web application 601 identifies the type of the requesting terminal (MFP 101 or mobile terminal 102) that has transmitted the request.

In step S1003, the web application 601 determines whether the request includes information for identifying a sequence of the web application 601. In the present exemplary embodiment, an example is described in which the determination is made by determining whether a sequence ID is attached to the request URL (URL for accessing the application server 104) as a query string, whereas other methods may be used. For example, information from which the sequence can be identified may be included in a cookie or an HTTP header. If the request includes the information for identifying the sequence (YES in step S1003), the processing proceeds to step S1004. If the request does not include the information for identifying the sequence (NO in step S1003), the processing proceeds to step S1020.

In step S1004, the web application 601 extracts sequence information including the sequence ID included in the query string of the request URL from the sequence management table 602. Specifically, the web application 601 extracts a record having the value of the SequenceID column 1401 that coincides with the sequence ID included in the query string of the request URL. In step S1005, the web application 601 determines whether the sequence information is successfully extracted in step S1004. If the sequence information is successfully extracted (YES in step S1005), the processing proceeds to step S1006. If not (NO in step S1005), the processing proceeds to step S1020.

In step S1006, the web application 601 transmits access information to the handover management unit 701 of the management server 103. The access information includes the type of the requesting terminal identified in step S1002 and the handover ID (the value in the HandoverID column 1403) included in the sequence information extracted in step S1004. In step S1007, the web application 601 receives a response to the access information transmitted in step S1006 from the handover management unit 701 of the management server 103. In step S1008, the web application 601 determines whether the response received in step S1007 is an error. If the response is an error (YES in step S1008), the processing proceeds to step S1030. If the response is not an error (NO in step S1008), the processing proceeds to step S1009.

In step S1009, the web application 601 identifies the operation status in the sequence from the sequence operation status data (the value in the SequenceData column 1402) included in the sequence information extracted in step S1004, and performs processing appropriate to the request. In step S1010, the web application 601 updates the sequence management table 602 with the status in the sequence on which the processing performed in step S1009 is reflected as the sequence operation status data.

In step S1011, the web application 601 determines whether the target sequence is completed based on the sequence operation status data. If the sequence is completed (YES in step S1011), the processing proceeds to step S1012. If the sequence is not completed (NO in step S1011), the processing proceeds to step S1015.

In step S1012, the web application 601 transmits a delete instruction for the handover information to the handover management unit 701 of the management server 103. Here, the web application 601 includes the handover ID (the value in the HandoverID column 1403) included in the sequence information extracted in step S1004 in the delete instruction as information for identifying the handover information to be deleted. In step S1013, the web application 601 receives a response to the delete instruction transmitted in step S1012 from the handover management unit 701 of the management server 103. In step S1014, the web application 601 deletes sequence information from the sequence management table 602. The sequence information to be deleted is the sequence information where the SequenceID column 1401 contains the sequence ID included in the query string of the request URL.

In step S1015, the web application 601 returns the result of the processing in step S1009 to the requesting terminal as a response to the request received in step S1001, and the processing is ended. The handover ID (the value in the HandoverID column 1403) is included in the response here. In the present exemplary embodiment, the handover ID is included in the custom header of the HTTP response, whereas other methods may be used.

In step S1020, the web application 601 issues anew sequence ID. In step S1021, the web application 601 registers new sequence information including the sequence ID issued in step S1020 in the sequence management table 602. The web application 601 registers the issued sequence ID in the SequenceID column 1401, and the current sequence operation status data in the SequenceData column 1402. The HandoverID column 1403 is blank at this point in time.

In step S1022, the web application 601 transmits a registration instruction for handover information to the handover management unit 701 of the management server 103. Here, the web application 601 includes a handover URL (the URL of the web application 601 to which the sequence ID is attached as a query string) and the type of the requesting terminal identified in step S1002 in the registration instruction as the handover information. In step S1023, the web application 601 receives a response to the registration instruction transmitted in step S1022 from the handover management unit 701 of the management server 103. The response includes a handover ID for identifying the registered handover information. In step S1024, the web application 601 registers the handover ID received in step S1023 in the HandoverID column 1403 of the sequence management table 602. The processing proceeds to step S1009, and the web application 601 performs the subsequent processing.

In step S1030, the web application 601 returns error information prohibiting subsequent operations to the requesting terminal as a response to the request received in step S1001. The processing is ended.

The effects of the flowchart of FIG. 10 will be described. The application server 104 can register the handover ID and the user's operation status in the sequence of the web application 601 in association with each other, and obtain and update the registered information each time the user accesses the web application 601 via the web browser of the MFP 101 or the mobile terminal 102. The application server 104 can also notify the management server 103 of the registered information.

FIGS. 11A to 11D are flowcharts for describing processing of the management server 103 according to the present exemplary embodiment. The steps in the flowcharts of FIGS. 11A to 11D are implemented by the CPU 411 of the management server 103 reading programs stored in the ROM 412 and the HDD 414 into the RAM 413 and executing the programs.

FIG. 11A is a flowchart for describing the processing performed by the management server 103 when the management server 103 receives a registration instruction for handover information from the application server 104. The flowchart of FIG. 11A corresponds to the processing of the management server 103 in steps S903 to S905 in the sequence diagram of FIG. 9.

In step S1101, the handover management unit 701 receives a registration instruction for handover information from the application server 104. The registration instruction includes a handover URL and the type of requesting terminal identified in step S1002.

In step S1102, the handover management unit 701 issues a new handover ID. In step S1103, the handover management unit 701 registers new handover information including the handover ID issued in step S1102 in the handover management table 702. Here, the handover management unit 701 registers the handover ID in the HandoverID column 1501, and the handover URL in the URL column 1502. If the requesting terminal is an MFP, the handover management unit 701 registers "TRUE" in the HandedoverFlag column 1503. If the requesting terminal is not an MFP, the handover management unit 701 registers "FALSE" in the HandedoverFlag column 1503.

In step S1104, the handover management unit 701 returns a response indicating the completion of the registration to the application server 104 as a response to the registration instruction received in step S1101. The processing is then ended. The response here includes the handover ID issued in step S1102.

FIG. 11B is a flowchart for describing the processing performed by the management server 103 when the management server 103 receives access information from the application server 104. The flowchart of FIG. 11B corresponds to the processing of the management server 103 in steps S910 and S911 and steps S921 and S922 in the sequence diagram of FIG. 9.

In step S1110, the handover management unit 701 receives access information from the application server 104. The access information includes a handover ID and the type of requesting terminal identified in step S1002. In step S1111, the handover management unit 701 extracts handover information including the received handover ID in the HandoverID column 1501 from the handover management table 702.

In step S1112, the handover management unit 701 determines whether the handover information is successfully extracted in step S1111. If the handover information is successfully extracted (YES in step S1112), the processing proceeds to step S1113. If not (NO in step S1112), the processing proceeds to step S1130. In step S1130, the handover management unit 701 returns a response indicating an error that the handover information is not found to the application server 104. The processing is then ended.

In step S1113, the handover management unit 701 determines whether the type of the requesting terminal received from the application server 104 in step S1110 is an MFP. If the type of the requesting terminal is an MFP (YES in step S1113), the processing proceeds to step S1114. If the type of the requesting terminal is not an MFP (NO in step S1113), the processing proceeds to step S1115.

In step S1114, the handover management unit 701 updates the handover management table 702 by setting "TRUE" in the HandedoverFlag column 1503 of the handover information extracted in step S1111. The processing proceeds to step S1116.

In step S1115, the handover management unit 701 determines whether the value in the HandedoverFlag column 1503 of the handover information extracted in step S1111 is "TRUE". If the value in the HandedoverFlag column 1503 is "TRUE" (YES in step S1115), the processing proceeds to step S1120. If the value is not "TRUE" (NO in step S1115), the processing proceeds to step S1116.

In step S1116, the handover management unit 701 returns a response indicating that the access information received in step S1110 is normally accepted to the application server 104. The processing is then ended.

In step S1120, the handover management unit 701 returns a response indicating an error that operations are prohibited to the application server 104. The processing is then ended.

Figure 11C:
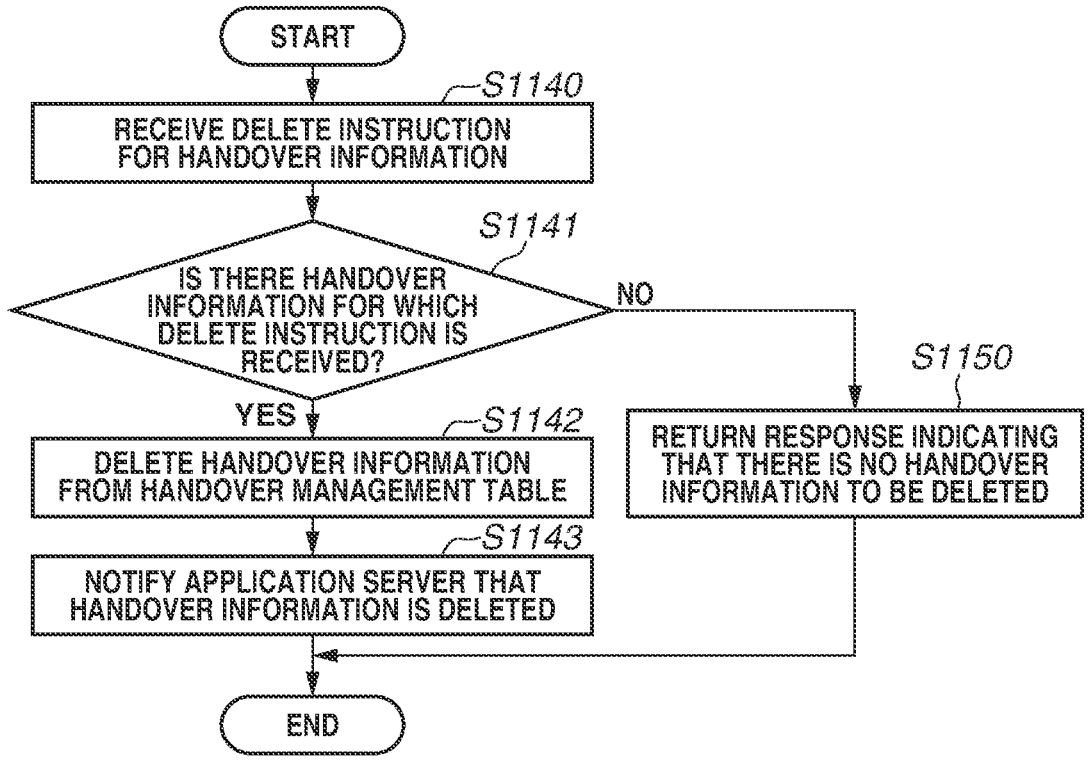

FIG. 11C is a flowchart illustrating the processing performed by the management server 103 when the management server 103 receives a delete instruction for handover information from the application server 104. The flowchart of FIG. 11C corresponds to the processing of the management server 103 in steps S926 and S927 in the sequence diagram of FIG. 9.

In step S1140, the handover management unit 701 receives a delete instruction for handover information from the application server 104. The delete instruction includes a handover ID. In step S1141, the handover management unit 701 determines whether there is handover information for which the delete instruction is received in the handover management table 702. Specifically, the handover management unit 701 determines whether there is a record having the value in column HandoverID 1501 that coincides with the value of the handover ID received in step S1140. If there is such handover information (YES in step S1141), the processing proceeds to step S1142. If not (NO in step S1141), the processing proceeds to step S1150. In step S1150, the handover management unit 701 returns a response indicating that there is no handover information to be deleted to the application server 104. The processing is then ended.

In step S1142, the handover management unit 701 deletes the record where the HandoverID column 1501 contains the value of handover ID received in step S1140 from the handover management table 702.

In step S1143, the handover management unit 701 notifies the application server 104 that the handover information is deleted as a response to the delete instruction received in step S1140. The processing is then ended.

Figure 11D:
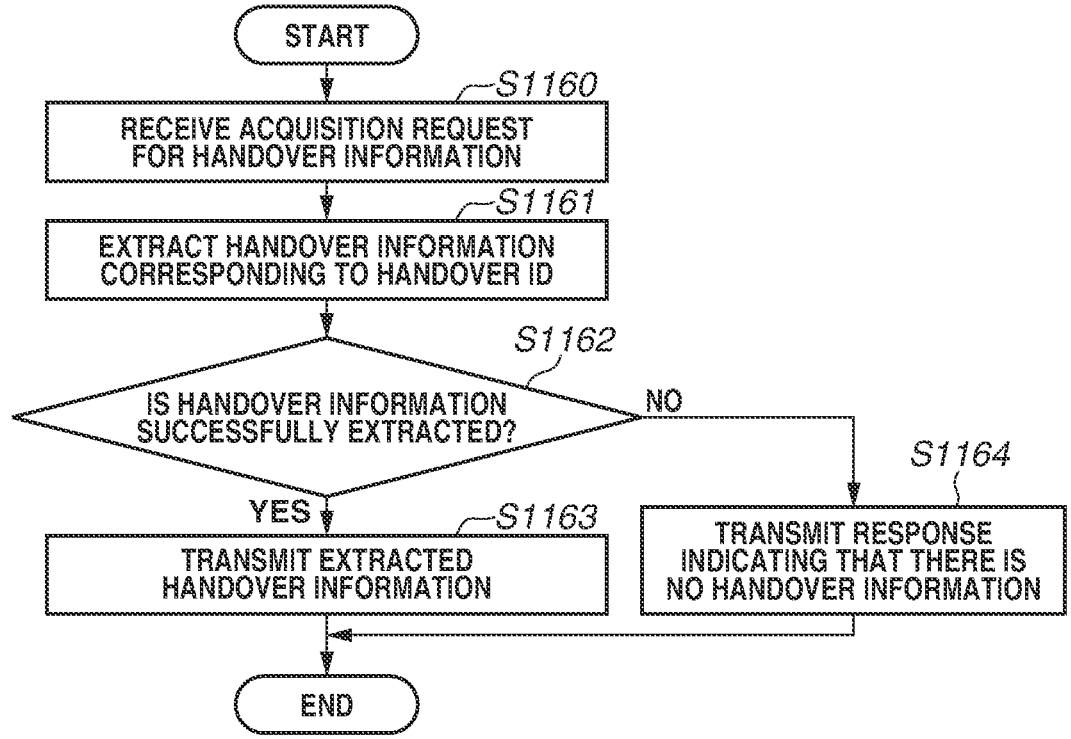

FIG. 11D is a flowchart illustrating the processing performed by the management server 103 when the management server 103 receives an acquisition request for handover information from the application server 104. The flowchart of FIG. 11D corresponds to the processing of the management server 103 in step S918 in the sequence diagram of FIG. 9.

In step S1160, the handover management unit 701 receives an acquisition request for handover information from the MFP 101. The acquisition request includes a handover ID.

In step S1161, the handover management unit 701 refers to the handover management table 702 and extracts handover information corresponding to the handover ID included in the acquisition request.

In step S1162, the handover management unit 701 determines whether the handover information is successfully extracted in step S1161. If the handover information is successfully extracted (YES in step S1162), the processing proceeds to step S1163. If not (NO in step S1162), the processing proceeds to step S1164.

In step S1163, the handover management unit 701 transmits the extracted handover information to the MFP 101 as a response to the acquisition request received in step S1160. The processing is then ended.

In step S1164, the handover management unit 701 transmits a response indicating that there is no handover information to the MFP 101 as a response to the acquisition request received in step S1160. The processing is then ended.

The effects of the flowcharts of FIGS. 11A to 11D will be described. The sequence information registered in the management server 103 can be updated based on instructions from the web application 601. The management server 103 can provide handover information to the MFP 101 in response to an acquisition request from the MFP 101.

FIGS. 12A and 12B are flowcharts illustrating processing of the mobile terminal 102 according to the present exemplary embodiment. The steps in the flowcharts of FIGS. 12A and 12B are implemented by the CPU 311 of the mobile terminal 102 reading programs stored in the ROM 312 and the flash memory 314 into the RAM 313 and executing the programs. FIG. 12A is a flowchart illustrating the processing of the mobile terminal 102 when the mobile terminal 102 receives a user operation. The flowchart of FIG. 12A corresponds to the processing of the mobile terminal 102 in steps S901 to S913 in the sequence diagram of FIG. 9.

In step S1201, the web content display unit 801 receives a start instruction for the web application 601 from the user, and accesses a start URL with which a sequence is started in the application server 104 (issues an acquisition request for web contents). In step S1202, the web content display unit 801 receives a response to the foregoing request from the application server 104. In step S1203, the web content display unit 801 determines whether the response includes a handover ID. Specifically, the web content display unit 801 determines whether the HTTP custom header includes a handover ID. While in the present exemplary embodiment the HTTP custom header is used to deliver a handover ID, other methods may be used. If the response includes a handover ID (YES in step S1203), the processing proceeds to step S1204. If the response does not include a handover ID (NO in step S1203), the processing proceeds to step S1205.

In step S1204, the web content display unit 801 stores the handover ID received in step S1202. In the present exemplary embodiment, the Web Storage API defined by Hypertext Markup Language version 5 (HTML5) is used to store the handover ID in Session Storage. However, other methods may be used.

In step S1205, the web content display unit 801 displays the response (web content) received in step S1202 on the operation unit 318. In step S1206, the web content display unit 801 waits for the user's operation. If the web content display unit 801 accepts the user's operation, the processing proceeds to step S1207. In step S1207, the web content display unit 801 determines whether the accepted user operation is an operation on the web application 601. If the accepted user operation is an operation on the web application 601 (YES in step S1207), the processing proceeds to step S1208. If not (NO in step S1207), the processing is ended.

In step S1208, the web content display unit 801 transmits a request corresponding to the user operation to the application server 104.

FIG. 12B is a flowchart illustrating the processing of the mobile terminal 102 when the mobile terminal 102 receives a connection request from the MFP 101. The flowchart of FIG. 12B corresponds to the processing of the mobile terminal 102 in steps S916 and S917 in the sequence diagram of FIG. 9.

In step S1211, upon receipt of a connection request from the MFP 101, the MFP cooperation unit 802 establishes a connection with the MFP 101 by short-range wireless communication. In step S1212, the MFP cooperation unit 802 obtains a handover ID from Session Storage. In step S1213, the MFP cooperation unit 802 determines whether a handover ID is successfully obtained in step S1212. If a handover ID is successfully obtained (YES in step S1213), the processing proceeds to step S1214. If not (NO in step S1213), the processing is ended.

In step S1214, the MFP cooperation unit 802 notifies the MFP 101 of the handover ID. In step S1215, the MFP cooperation unit 802 initializes the screen of the operation unit 318. The processing is ended.

The establishment of the connection in step S1211 may be initiated by either the mobile terminal 102 or the MFP 101. For example, in a configuration where the mobile terminal 102 determines the distance from the MFP 101 based on the radio field intensity of a Bluetooth (registered trademark) beacon issued from the MFP 101, the mobile terminal 102 initiates the connection to the MFP 101.

The effect of the flowchart of FIG. 12 will be described. The mobile terminal 102 can obtain a handover ID by accessing the application server 104, store the handover ID, and notify the MFP 101 of the handover ID.

Figure 13:
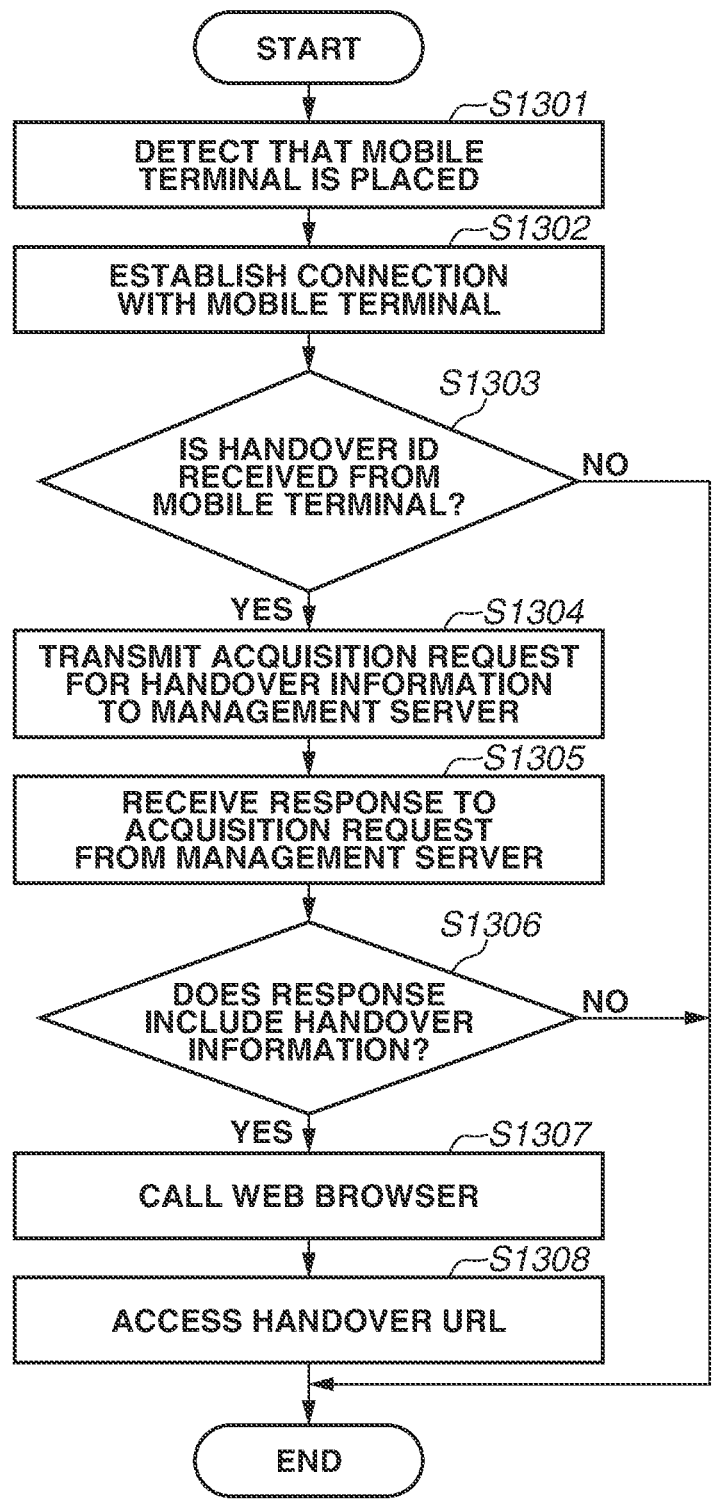
FIG. 13 is a flowchart illustrating processing of the MFP according to the present exemplary embodiment.

FIG. 13 is a flowchart illustrating the processing of the MFP 101 when the mobile terminal 102 is placed on the mobile terminal placing spot. The flowchart of FIG. 13 corresponds to the processing of the MFP 101 in steps S915 to S929 in the sequence diagram of FIG. 9. The steps in the flowchart of FIG. 11 are implemented by the CPU 211 of the MFP 101 reading programs stored in the HDD 214 into the RAM 213 and executing the programs.

In step S1301, the mobile terminal cooperation unit 501 detects that the mobile terminal 102 is placed on the mobile terminal placing spot by using the contact detection sensor 224. The mobile terminal cooperation unit 501 may be configured to issue a Bluetooth (registered trademark) beacon if the mobile terminal 102 is detected to be placed. In step S1302, the mobile terminal cooperation unit 501 establishes a connection with the mobile terminal 102 by short-range wireless communication.

In step S1303, the mobile terminal cooperation unit 501 waits for the reception of a handover ID from the mobile terminal 102 for a certain time. If a handover ID is received (YES in step S1303), the processing proceeds to step S1304.

If the certain time has elapsed without receiving a handover ID (NO in step S1303), the processing is ended.

In step S1304, the menu display unit 502 transmits an acquisition request for handover information corresponding to the handover ID received in step S1303 to the handover management unit 701 of the management server 103.

In step S1305, the menu display unit 502 receives a response to the acquisition request for handover information from the handover management unit 701 of the management server 103.

In step S1306, the menu display unit 502 determines whether the response received in step S1305 includes handover information. If handover information is included (YES in step S1306), the processing proceeds to step S1307. If handover information is not included (NO in step S1306), the processing is ended.

In step S1307, the menu display unit 502 calls the web browser 503 to access a handover URL included in the handover information. In step S1308, the web browser 503 accesses the handover URL (web application 601). The web browser 503 then accepts the user's operations as appropriate, interacts with the web application 601, and executes the web application 601.

The effect of the flowchart of FIG. 13 will be described. The MFP 101 establishes a connection with the mobile terminal 102, receives a handover ID from the mobile terminal 102, and receives handover information corresponding to the handover ID from the management server 103. The MFP 101 can then perform processing based on the handover information.

In the procedure described in the present exemplary embodiment, the operation status of a web application cooperating with an MFP and being operated on a mobile terminal can be handed over to the MFP by simply moving the mobile terminal to a position at a predetermined distance from the MFP. This improves the convenience of the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-102883, filed May 31, 2019, which is hereby incorporated by reference herein in its entirety.

What is claimed is:

1. An information processing system comprising:
a web server configured to provide a sequence of operation screens;
an image processing apparatus configured to access the web server; and
an information processing apparatus configured to access the web server,
wherein the web server includes
a first memory, and
a first processor in communication with the first memory,
wherein the first processor performs
registering first information indicating a first operation screen operated on the information processing apparatus and a status of operation, and
providing a second operation screen to the image processing apparatus,
wherein the image processing apparatus includes
a second memory, and
a second processor in communication with the second memory,
wherein the second processor performs
receiving second information corresponding to the registered first information, and
displaying the second operation screen provided by the web server,
wherein, in a case where the image processing apparatus and the information processing apparatus are close to each other, the second information corresponding to the registered first information is transmitted from the information processing apparatus to the image processing apparatus,
the image processing apparatus is configured to access the web server, based on the transmitted second information, and
wherein the displaying includes displaying the second operation screen, provided by the web server, on which the status of operation is reflected, based on the registered first information corresponding to the transmitted second information.

2. The information processing system according to claim 1, wherein the case where the image processing apparatus and the information processing apparatus are close to each other refers to a case where the image processing apparatus and the information processing apparatus communicate by near field communication (NFC).

3. The information processing system according to claim 1, wherein the case where the image processing apparatus and the information processing apparatus are close to each other refers to a case where a Bluetooth (registered trademark) packet transmitted from the image processing apparatus and received by the information processing apparatus has a radio field intensity higher than or equal to a predetermined value.

4. The information processing system according to claim 3, wherein the second processor further performs
detecting that the information processing apparatus is placed on a predetermined position, and
in a case where the information processing apparatus is detected to be placed on the predetermined position, transmitting the Bluetooth (registered trademark) packet.

5. The information processing system according to claim 1, wherein the first processor further performs updating the registered first information each time the first operation screen transitions based on a user operation.

6. The information processing system according to claim 1, wherein the status of operation includes setting information set on a plurality of first operation screens.

7. The information processing system according to claim 1, wherein the second operation screen on which the status of operation is reflected is a second operation screen including setting information set on the or each first operation screen displayed before the second operation screen.

8. The information processing system according to claim 1, wherein the providing includes referring to the registered first information corresponding to the second information, and providing the second operation screen on which the status of operation is reflected based on an identifier of the first operation screen and setting information set on the or each first operation screen displayed before the second operation screen.

9. The information processing system according to claim 1, wherein the first processor further performs, if transition of the operation screen is caused to proceed to an end of a predetermined series of processes, deleting the registered first information.

10. The information processing system according to claim 1, wherein the operation screen is an operation screen of a web application.

11. The information processing system according to claim 1, wherein the operation screen is an operation screen for making a setting to execute a function of the image processing apparatus.

12. The information processing system according to claim 1, wherein the first processor further performs transmitting the second information corresponding to the registered first information to the information processing apparatus.

13. The information processing system according to claim 12, wherein the second processor performs receiving, from the information processing apparatus, the second information received by the information processing apparatus from the web server.

14. The information processing system according to claim 1, wherein the first processor further performs giving an instruction to register handover information associated with the registered first information.

15. The information processing system according to claim 14, further comprising a management server configured to manage the handover information,
wherein the giving of the instruction includes instructing the management server to register the handover information.

16. The information processing system according to claim 15, wherein the second processor performs notifying the management server of the received second information, and obtaining handover information corresponding to the notified second information from the management server.

17. The information processing system according to claim 14,
 wherein the handover information includes a handover Uniform Resource Locator (URL) obtained by attaching an identifier of the registered first information to a URL for accessing the web server, and
 wherein the displaying includes displaying a second operation screen obtained by making access using the handover URL.

18. An image processing apparatus configured to access a web server and communicate with an information processing apparatus, the web server being configured to provide a sequence of operation screens, the image processing apparatus comprising:
 a memory; and
 a processor in communication with the memory,
 wherein the processor performs
   receiving second information corresponding to first information indicating a first operation screen operated on the information processing apparatus and a status of operation, the first information being registered in the web server, and
   displaying a second operation screen provided by the web server,
 wherein, in a case where the information processing apparatus and the image processing apparatus are close to each other, the receiving includes receiving the second information from the information processing apparatus, and
 wherein the displaying includes accessing the web server based on the received second information, and displaying the second operation screen provided by the web server, a status of operation corresponding to the received second information being reflected on the second operation screen.

19. A web server configured to provide a sequence of operation screens and to be accessed by an information processing apparatus and an image processing apparatus, the web server comprising:
 a memory; and
 a processor in communication with the memory,
 wherein the processor performs
   registering first information indicating a first operation screen operated on the information processing apparatus and a status of operation,
   providing a second operation screen to the image processing apparatus, and
   transmitting second information corresponding the registered first information to the information processing apparatus, and
 wherein the providing includes providing the second operation screen on which a status of operation corresponding to the second information is reflected to the image processing apparatus, based on the second information received by the image processing apparatus from the information processing apparatus.

20. A method for an image processing apparatus configured to access a web server and communicate with an information processing apparatus, the web server being configured to provide a sequence of operation screens, the method comprising:
 receiving second information corresponding to first information indicating a first operation screen operated on the information processing apparatus and a status of operation, the first information being registered in the web server; and
 displaying a second operation screen provided by the web server,
 wherein in a case where the information processing apparatus and the image processing apparatus are close to each other, the receiving includes receiving the second information from the information processing apparatus, and
 wherein the displaying includes accessing the web server based on the received second information, and displaying the second operation screen provided by the web server, a status of operation corresponding to the received second information being reflected on the second operation screen.

21. A non-transitory computer-readable storage medium storing a program to cause a computer to perform a method for an image processing apparatus configured to access a web server and communicate with an information processing apparatus, the web server being configured to provide a sequence of operation screens, the method comprising:
 receiving second information corresponding to first information indicating a first operation screen operated on the information processing apparatus and a status of operation, the first information being registered in the web server, and
 displaying a second operation screen provided by the web server,
 wherein in a case where the information processing apparatus and the image processing apparatus are close to each other, the receiving includes receiving the second information from the information processing apparatus, and
 wherein the displaying includes accessing the web server based on the received second information, and displaying the second operation screen provided by the web server, a status of operation corresponding to the received second information being reflected on the second operation screen.

* * * * *